J. M. TOWNE.
COUPLING GASKET.
APPLICATION FILED JULY 22, 1909.
1,041,907.
Patented Oct. 22, 1912.
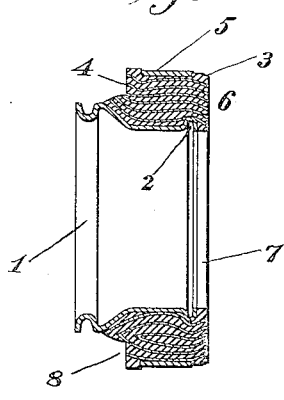
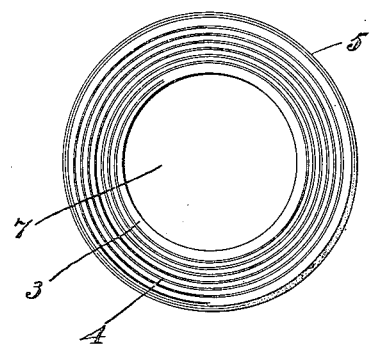
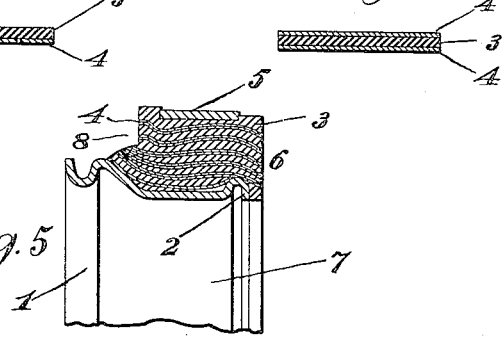
Witnesses:
Inventor
Joseph M. Towne
By John L. Crowling
Attorney

UNITED STATES PATENT OFFICE.

JOSEPH M. TOWNE, OF EAST ORANGE, NEW JERSEY, ASSIGNOR TO SAFETY CAR HEATING & LIGHTING COMPANY, A CORPORATION OF NEW JERSEY.

COUPLING-GASKET.

1,041,907.

Specification of Letters Patent.

Patented Oct. 22, 1912.

Application filed July 22, 1909. Serial No. 508,914.

*To all whom it may concern:*

Be it known that I, JOSEPH M. TOWNE, a citizen of the United States, residing in East Orange, county of Essex, and State of New Jersey, have invented new and useful Improvements in Coupler-Gaskets, of which the following is a description.

My invention pertains to that class of gaskets intended to be made up so as to form a fluid tight joint which may be readily opened or made whenever desired as, for instance, in couplings used for temporary connection between lengths of hose.

My invention has for its particular object to provide a gasket which will withstand the heavy pressure necessary against its face and maintain a tight joint throughout continued usage.

My improved gasket is particularly applicable to couplers intended to make a steam tight connection between the steam hose used on railway cars and, therefore, will be described in reference to a gasket intended for this purpose. For this use, particularly in connection with the straight-port type of coupler, the gasket has to withstand very heavy pressure against its face as well as high internal pressure and is also subjected to high temperature owing to the high pressure steam passing therethrough. In this type of gasket it is advantageous that the same shall not only withstand heavy pressure against its face and resist abrasion but shall have the property of expanding considerably under the action of heat and also possess considerable resiliency.

Figure 1 represents a vertical cross section of one form of my improved gasket. Fig. 2 represents a front elevation of the face of my gasket as shown in Fig. 1. Fig. 3 is an enlarged view of a section of the material used in making up one form of my gasket as shown in Fig. 1. Fig. 4 is an enlarged section showing the material used in making up another form of gasket. Fig. 5 is a vertical section of a portion of the gasket similar to that shown in Figs. 1 and 2 made up of the material as shown in Fig. 4.

Referring to the drawing, particularly Figs. 1, 2 and 5, 1 represents the internal thimble or sleeve adapted to hold my gasket in place and to relieve the same of internal pressure. This is provided with a spun flange as indicated at 2 and carries the laminated yielding portion of the gasket indicating by the laminæ 3 and 4.

5 represents a metallic sleeve or annular ring which is forced over the outside of the resilient portion of the gasket in such manner as to reinforce the same.

6 represents the face of the gasket adapted to be forced against the face of a like gasket in order to maintain the pressure tight joint, while 7 represents the aperture through which the steam passes.

8 represents the back of the gasket adapted to maintain a steam tight joint between itself and the portion of the coupler by which it is carried.

In making my gasket as shown in Fig. 1, I first make up strips of material as shown in section in Fig. 3 in which 3 represents a cross section of a thin ribbon of rubber or any suitable resilient and vulcanizable substance or compound and 4 represents a section of a thin ribbon of any suitable fibrous material. These two ribbons are cemented together and then wound upon the thimble 1 until a greater outside diameter is reached than is desired for the finished gasket. The width of the ribbon also is greater than the depth of the desired finished gasket. As this ribbon is wound upon the thimble, cement of any suitable character is applied between the layers so as to quite firmly cement the same together. When thus built up the gasket is placed in a suitable die or mold where the resilient material is pressed into, approximately, the shape as shown in cross section in Fig. 1. While still in the mold and subjected to this pressure the gasket is brought to that temperature necessary to suitably vulcanize that portion of the material indicated by 3. After this the gasket is removed from the mold and may be turned to the proper size and shape and then the ring 5 is forced on. The material shown in section in Fig. 4 is the same as that shown in Fig. 3 except that the vulcanizable material 3 is first provided with a strip of the fibrous material 4 which is cemented upon each side thereof to form the tape which is wound up upon the thimble which is afterward treated as above set forth and when so finished produces a gasket as shown in section by Fig. 5.

In some cases I provide the ribbon 4 with numerous small apertures 9 running therethrough so that when the different laminæ are forced together in the mold, the material 3 may be forced through these apertures so as to unite on both sides of the fibrous material 4. In practice, I find that a very suitable material to be used for the vulcanizable portion 3 is that material known by the trade name of "usudurian" and that a very good material from which to make the fibrous portion 4 is a long fibered asbestos paper, and very good practical results are obtained where the materials indicated as 3 and 4 are layers of these materials above mentioned, each practically 1/64 inch in thickness.

I do not wish in any way to limit myself to the exact type of gasket shown in the drawing nor in any way to the exact method of making up the same above recited, for it is obvious that wide changes may be made in the form of the gasket according to what use it may be designed for and wide changes may be made in the way in which the gasket is made up from that above described, which is simply one manner in which my gasket can be made and which is given in sufficient detail to enable one skilled in the art to make and use the same.

Having thus described my invention what I desire to protect by Letters Patent is as set forth in the following claims to wit:

1. A gasket comprising a thimble of metal having an exterior annular portion formed of alternate laminæ of vulcanizable and harder fibrous materials.

2. A gasket comprising a thimble of metal having an exterior annular portion composed of alternate spirally-wound continuous layers of vulcanized and fibrous materials.

3. A gasket comprising a thimble of metal having and annular portion formed of alternate layers of vulcanized and harder fibrous materials wound concentric thereto.

4. A gasket comprising a thimble of metal having alternate layers of hard fibrous and softer elastic materials spirally wound about the same.

5. A gasket comprising a thimble of rigid material having a yielding cover composed of alternate layers of asbestos and rubber vulcanized together.

6. A gasket adapted to withstand fluid pressure in a radial direction and to withstand compression in a longitudinal direction, composed of a central metal thimble having a ribbon of hard fibrous and softer vulcanized materials wound about the center of pressure thereof with the laminæ running in the direction of compression.

7. A gasket comprising a metallic sleeve with alternate laminæ of vulcanized and fibrous materials surrounding the same and carried thereby, so shaped as to present an abutting surface of the laminated material for making temporary fluid joints.

8. A gasket comprising a metallic sleeve having an expanded portion, an elastic portion retained upon the said sleeve by said expanded portion and composed of alternate laminæ of vulcanized and fibrous materials.

9. A gasket comprising an internal metallic sleeve having an aperture therethrough, an elastic portion carried by said sleeve and composed of laminæ of elastic and fibrous materials united to each other and to said sleeve.

10. A gasket comprising an elastic portion composed of laminæ of fibrous and vulcanized materials and having a metallic armor ring surrounding the same.

11. A gasket adapted to be compressed between two members to form a fluid tight joint formed of a central, rigid thimble having layers of fibrous and elastic materials surrounding the same, the edges of said layers extending from one of the compression surfaces to the other.

12. A gasket comprising an internal metallic sleeve, an elastic portion composed of layers of elastic and fibrous materials and a peripheral reinforcing member carried by the elastic material.

13. A gasket of substantially annular form for compression between two members to form a fluid tight joint, comprising superimposed layers of fibrous and elastic materials with the layers extending from one compression surface to another, an internal sleeve and an external sleeve engaging the bore and periphery of said gasket and coöperating to retain the same in definite configuration under pressure.

14. A gasket having a bore, a periphery and two abutment faces adapted to be compressed between two members to form a fluid tight connection for the passage of fluid through said bore, comprising alternate layers of fibrous and vulcanized materials extending from one abutment face to the other and provided with a reinforcing sleeve in said bore and a reinforcing sleeve upon said periphery coöperating to strengthen said gasket against distortion under compression.

15. A gasket in the form, substantially, of a hollow cylinder having a central core surrounded by alternate layers of fibrous and elastic material, the fibrous material having apertures therein through which the elastic material may unite the superposed laminæ of fibrous material.

16. A gasket comprising a central core of cylindrical form and predetermined length having wound upon its outer surface alternate layers of fibrous and elastic materials, the length of said wound material, parallel with the length of the core, being less than the length of the core, whereby to provide a shoulder or face at an angle to the length of the core.

JOSEPH M. TOWNE.

Witnesses:
 JOHN T. CLARK,
 E. HALL.